Dec. 30, 1969     C. E. SCHEFFLER     3,487,247
PROTECTION DEVICE FOR A SPEED SENSING SYSTEM
Filed Nov. 4, 1968     2 Sheets-Sheet 1
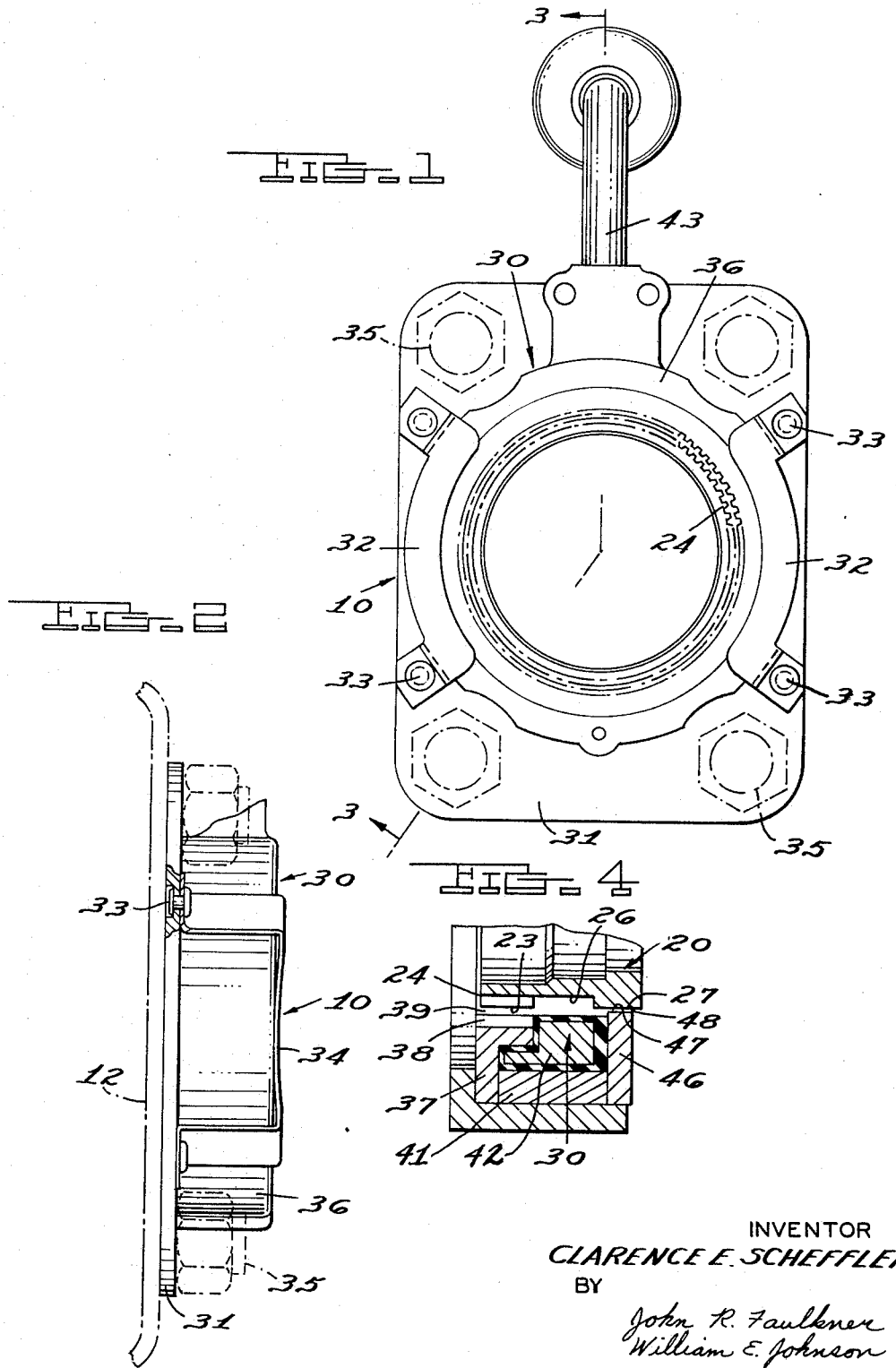
INVENTOR
CLARENCE E. SCHEFFLER
BY
John R. Faulkner
William E. Johnson
ATTORNEYS

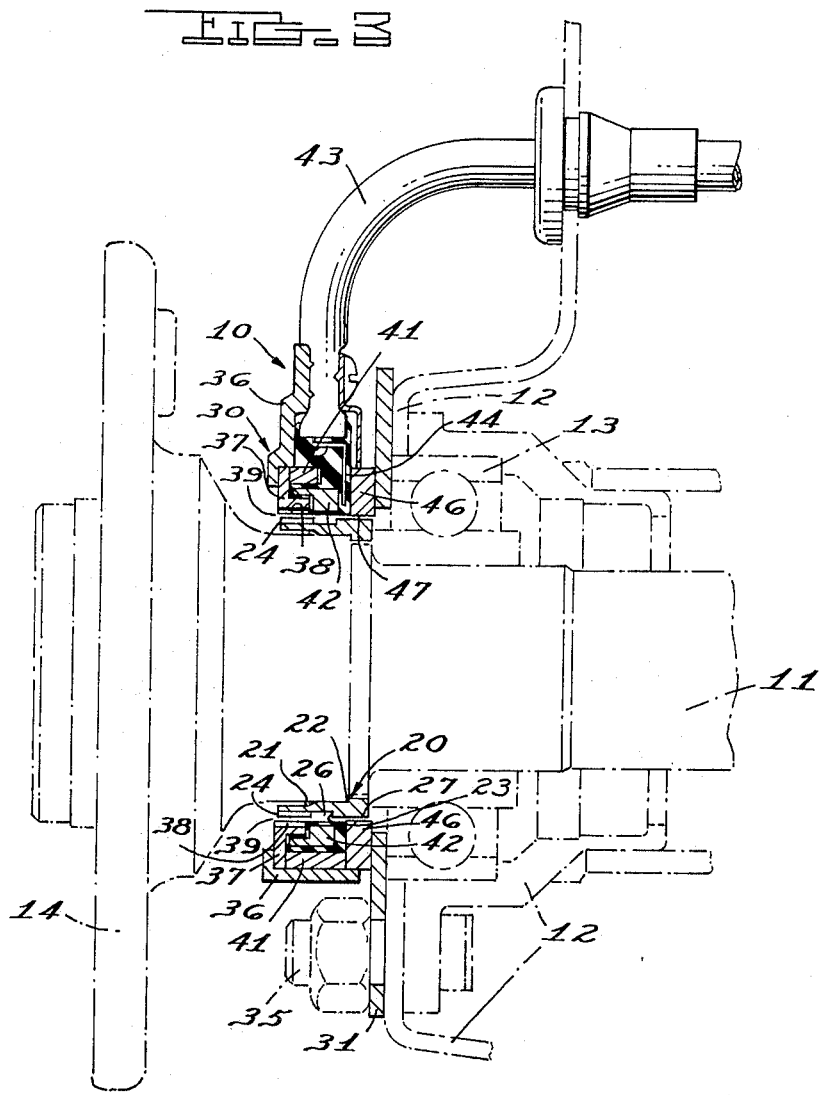

United States Patent Office 3,487,247
Patented Dec. 30, 1969

3,487,247
PROTECTION DEVICE FOR A SPEED
SENSING SYSTEM
Clarence E. Scheffler, Detroit, Mich., assignor to Ford
Motor Company, Dearborn, Mich., a corporation of
Delaware
Filed Nov. 4, 1968, Ser. No. 772,961
Int. Cl. H02k 21/10
U.S. Cl. 310—168                                5 Claims

ABSTRACT OF THE DISCLOSURE

A speed sensing system, including a rotatable member and a stationary member, has a rotor member attached to the rotatable member. The rotor member has both a plurality of teeth spaced about a circumferential surface thereof and a rotor protection device with a surface of fixed diameter coaxial with the teeth. A stator member is movably mounted on the stationary member and the stator member has a plurality of teeth spaced about a circumferential surface. The teeth of the two members are in juxtaposition with one another when the members are in an assembled position. A stator protection device also forms a portion of the stator member. The stator protection device also have a surface of fixed diameter coaxial with the teeth of the stator member. The rotor protection device and stator protection device are located in an encircling relationship and their surfaces of fixed diameter have the diameters so chosen that an air gap exists between the surfaces which is smaller than the air gap which exists between the teeth. The contact of the two surfaces of the protection devices during deflection of the rotatable member from a normal position prevents contact of the teeth of the rotor member and the stator member during such deflection.

BACKGROUND OF THE INVENTION

In developing a speed sensing system for utilization as a control element for a vehicle anti-skid system, it was found most desirable to locate individual speed sensing systems on each axle supporting a wheel controlled by the anti-skid system. In particular, a rotor member including a plurality of teeth is mounted on the axle supporting a wheel, and a stator member also including a plurality of teeth is mounted on the axle housing in juxtaposition to the rotor member. In accordance with known concepts, a mangetic field is created in the air gap between the teeth and the periodic variation of the size of the air gap caused by the relative rotation between the axle and the axle housing produces an alternating signal indicative of the speed of the axle. Such a system is suitable for detecting the speed of a particular wheel associated with the axle and for feeding such information to a logic circuit for the anti-skid system. The logic circuit utilizes the information for controlling the braking pressure applied to the wheel associated with the speed sensing system.

Certain difficulties are encountered with the speed sensing system because during normal operation of the motor vehicle, the axle supporting the rotor member of the system is subject to forces which cause the axle to deflect from other than its normal position. Deflection of the axle causes engagement of the teeth of the rotor member with the teeth of the stator member if the normal air gap between the teeth is less than the amount of axle deflection. Once an intermeshing of the teeth occurs, the teeth are destroyed and the sensing system no longer functions.

The difficulty may be avoided by increasing the air gap between the teeth of the rotor member and the stator member to such a dimension that any reasonably expected deflection of the axle during use thereof would not cause intermeshing of the teeth. In this situation, however, the maximum and minimum dimensions for the air gap of the magnetic flux path through the teeth is increased to such a level that the sensitivity of the speed sensing system is reduced and no longer provides a detecting system suitable for use in an antiskid system.

The speed sensing system protection device of this invention permits the reduction of the air gap between the teeth of the rotor member and the stator member to such a dimension that the speed sensing system has a degree of sensitivity sufficient for use in an anti-skid control system. The speed sensing system protection device of this invention permits deflection of the stator member from its normal position when the axle supporting the rotor member is deflected. The deflection of the stator member in conjunction with the rotor member occurs before the teeth on the two members come into meshing engagement with one another.

SUMMARY OF THE INVENTION

This invention relates to a protection device for utilization in a speed sensing system and, more particularly, to a protection device which prohibits intermeshing of the teeth associated with a rotor member and a stator member of the sensing system during normal operation thereof.

In its broad aspects the speed sensing system includes a rotatable member and a stationary member located in proximity to the rotatable member. The protection device for the system includes a rotor attached to the rotatable member. The rotor has a plurality of spaced teeth on a circumferential surface thereof. A stator is movably mounted on the stationary member and the stator also includes a plurality of spaced teeth located in juxtaposition to the orbital path of the rotor's teeth. The teeth of the rotor and the stator are separated by a small air gap when the rotatable member supporting the rotor is in a normal, nondeflected position. Means are provided which are responsive to the movement of the rotatable member and the rotor from their normal positions in a particular direction for deflecting the stator also in the particular direction so that the teeth on the rotor and the stator do not intermesh during deflection of the rotatable member.

In greater detail, the rotor has a circumferential surface of fixed diameter coaxial with the rotor teeth. Similarly, the stator has a circumferential surface of fixed diameter coaxial with the stator teeth. In an assembled position the rotor and the stator are so located relative to one another that the two circumferential surfaces are closely adjacent one another with one surface encircling the other surface. An air gap exists between the two surfaces which is smaller than the air gap between the teeth of the rotor and stator. When the rotatable member supporting the rotor is deflected, the circumferential surfaces come into contact with one another prior to contact of the teeth. Further deflection of the rotatable member supporting the rotor then causes the stator to deflect in the same general direction thereby insuring the continued maintenance of the space or air gap between the teeth of the speed sensing system and the system is protected from destruction.

BRIEF DESCRIPTION OF THE DRAWINGS

FIGURE 1 is a front elevational view of the protection device and portion of the speed sensing system of this invention. FIGURE 2 is a side elevational view of the device of this invention showing in cross section the manner of mounting a portion of the device. FIGURE 3 is a view of the speed sensing system in association with an axle shaft and an axle housing, the speed sensing system being shown in cross section as taken along line 3—3 of FIGURE 1. FIGURE 4 is an enlarged view showing details of the speed sensing system.

DESCRIPTION OF THE PREFERRED EMBODIMENT

Construction

The protection device for the speed sensing system of this invention is shown in a preferred embodiment as utilized as a pickup transducer for an anti-skid system of an automotive vehicle. More particularly, in the preferred embodiment the speed sensing system includes a rotatable member which is an axle shaft for a wheel of a motor vehicle and a stationary member which is an axle housing for the vehicle.

The speed sensing system and protection device therefor is shown in FIGURE 1 and generally identifies therein by the numeral 10. As best seen in FIGURE 3, the speed sensing system 10 is utilized in conjunction with a rotatable axle shaft 11 and a stationary axle housing 12. A roller bearing unit 13 is interposed between the shaft 11 and the housing 12 to permit smooth rotation of the shaft. The axle 11 terminates in an enlarged portion 14 against which a brake drum and a vehicle wheel are mounted.

The speed sensing system 10 of this invention is utilized to develop an electrical signal which is indicative of the relative speed of rotation of the axle shaft with respect to the axle housing. The speed differential between the shaft and housing is proportional to the speed of the associated vehicle wheel over the road surface. The electrical signal indicative of the speed of the vehicle wheel is fed to a logic circuit of the anti-skid system which controls the braking pressure applied to the vehicle brakes. For example, if the detected change of speed of rotation of the axle with respect to the housing is extremely high when the brakes of the vehicle are initially applied, this indicates that the assoicated vehicle wheel is in a skidding condition and correction is required. Correction would be in the form of a release of the braking pressure applied on the brakes associated with the particular wheel. Upon release of the braking pressure, the vehicle wheel speeds up to the rotataional rate at which it should be during an early phase of the braking of the vehicle. Such action thereby eliminates the skidding condition.

In order to develop the electrical signal indicative of the speed of the associated vehicle wheel, the speed sensing system 10 includes a rotor member, generally identified by the numeral 20 and best seen in FIGURE 3, which is attached to and encircles a portion of the axle 11. More particularly, the rotor member 20 has a carefully machined internal circumferential surface 21 which is press fitted on an external circumferential surface of the axle shaft 11. The rotor member 20 also has a lip surface 22 which positions the member relative to the axle shaft.

An external circumferential surface 23 of the rotor member 20 is carefully machined so as to have a predetermined diameter. A plurality of teeth 24, sixty five in the preferred embodiment, are formed on the circumferential surface 23. The diameter of the teeth is equal to the diameter of the surface. A circumferential recess 26 is also machined into the surface 23 thereby separating the teeth 24 from a smooth circumferential surface 27 also forming a portion of the outer circumferential surface 23. The surface 27 is coaxial with the axle shaft 11. The diameter of the surface 27 is equal to the diameter of the teeth 24 of the rotor member 20.

In order to complete the speed sensing system 10, a stator member, generally identified by the numeral 30, is utilized in conjunction with the rotor member 20. The stator member 30 is attached to a support plate 31 in such a manner that the stator member is movable relative to the plate. As best seen in FIGURES 1 and 2, a pair of spring steel clip members 32 are positioned on opposite sides of the stator member 30. The ends of each of the clip members are attached to the support plate 31 by means of rivets 33. Each of the clip members 32 is bowed inwardly at a central portion 34 thereof as best seen in FIGURE 2 so as to apply pressure on the stator member inwardly toward the support plate. In such a manner the rear portion of the stator member 30 is in frictional contact with the support plate 31 thereby to provide a form of resistance for movement of the stator member with respect to the plate. The plate 31, in turn, is secured to the axle housing by bolts 35 passing through suitable openings therein.

In greater detail, the stator member 30 includes a stator housing 36 of generally annular configuration. The rear portion of the stator housing 36 provides the surface which is in frictional contact with the support plate 31. A stator 37 of annular configuration is supported within the stator housing 36. The stator 37 has a plurality of teeth 38 positioned about an internal circumferential surface thereof. The teeth 38 have a predetermined diameter. The teeth 38 are equal in number to and are in juxtaposition to the orbital path of the teeth 24 of the rotor member 20. A small air gap 39 exists between the two sets of teeth when they are in these normal positions (see FIGURE 4).

In order to create a magnetic circuit across the air gap 39 between the two sets of teeth, the size of which air gap is varied by relative movement of the two sets of teeth, an annular permanent magnet 41 is positioned within the stator housing 36. The magnet is magnetized in a direction along the centerline of the axle shaft 11. Relative rotation of the rotor member and the stator member causes a variation in the dimension of the air gap between the teeth. This air gap is at a minimum when the teeth of the two members oppose one another and is at a maximum when the teeth are in a staggered position relative to one another. The result variation in the effective dimension of the air gap 39 produces a periodic variation in the magnetic flux that threads the stator member 30.

To detect the periodic variation in the magnetic flux produced by the relative rotation of the rotor member and the stator member, an annular, insulated coil 42 is positioned within the stator housing 36. An alternating current voltage is produced in the coil 42 by the alternating change in the magnetic flux passing through the stator housing. This alternating signal produced in the coil is the signal which is utilized in the circuitry of the anti-skid system. Connection is made to the circuitry of the anti-skid system from the coil 42 by means of an external lead 43 which is connected to the coil 42 by means of an internal lead 44.

The stator 37, the magnet 41 and the coil 42 are all retained within the stator housing 36 by means of a locking member 46 of generally annular configuration. The locking member 46 has an internal annular circumferential surface 47 of a diameter slightly smaller than the diameter of the teeth 38 of the stator 37. The locking member's surface 47 is positioned adjacent the smooth circumferential surface 27 of the rotor member 20. An air gap 48 is provided between the surfaces 47 and 27, best seen in FIGURE 4. The air gap 48 is smaller in dimension than the air gap 39 provided between the sets of teeth 24 and 37. In a normal construction the air gap between the sets of teeth would be in the order of 0.030 inch whereas the air gap 48 between the two surfaces would only be 0.012 inch. When the air gap 39 between the teeth has such a small dimension, a high degree of sensitivity is imparted to the speed sensing system.

Operation

The complementary, smooth surfaces 27 and 47, respectively, of the rotor member 20 and the locking member 46, in conjunction with the floating mounting of the stator housing 36 on the support plate 31, form the means for protecting the teeth of the speed sensing system from coming into contact with one another during operation of the system.

During normal operation of the vehicle, loads or forces are sometimes applied to the axle shaft 11 which cause a deflection of the shaft from other than its normal position with respect to the axle housing 13. The protection device of this invention functions such that the movement of the axle shaft in a particular direction also may, if deflection is sufficient, cause the stator member 30 to move in the particular direction. When deflection of the axle 11 occurs, the smooth circumferential surface 27 of the rotor member is first moved to close the small air gap 48 between itself and the circumferential surface 47 of the locking member 46. When the two surfaces come in contact with one another at a particular position, the air gap 39 between the sets of teeth is reduced but not totally eliminated at the particular position. Further deflection of the axle 11 causes a force to be applied through the locking member 46 to the stator housing 36. This force acts on the stator housing to move it relative to the support plate 31. The floating mounting of the stator housing with respect to the support plate provides the means for insuring that at least a relatively small air gap will exist at all times between the sets of teeth even though the axle shaft is deflected from its normal position.

When the load or force is removed from the axle shaft 11, the axle shaft returns to its normal position and the full air gap 48 is once again re-established between the two surfaces 27 and 47. In such a manner, that is, by utilizing a pair of protection surfaces and a floating mounting for the stator housing, a relatively small air gap 39 is initially established and maintained between the two sets of teeth.

If the protection device of this invention was not included in the speed sensing system, the air gap 39 would have to be increased substantially to insure that the teeth would not come into engagement with one another under any load conditions to which the axle 11 might be subjected. A substantial increase in the air gap 39 between the two sets of teeth does, of course, drastically reduce the sensitivity of the pickup transducer. Such a reduction in sensitivity does reduce the desirability of utilizing this type of speed pickup system for an anti-skid device.

The protection system for a speed sensing system in accordance with the teachings of this invention is one that is relatively inexpensive to construct. The protection device allows the use of a relatively small air gap between the rotating and stationary portions of the speed sensing system and thereby increases the sensitivity of the system. The device is also extremely reliable in operation and permits a continuous output from the speed sensing system although loads are being applied to the rotatable shaft which cause deflection of the shaft during its operation.

What is claimed is:

1. In a speed sensing system including a rotatable member and a stationary member located in proximity to the rotatable member;
   a rotor attached to the rotatable member, said rotor including a plurality of spaced teeth;
   a stator movably mounted on the stationary member, said stator including a plurality of spaced teeth located in juxtaposition to the orbital path of said spaced teeth of said rotor, said juxtaposed teeth of said rotor and said stator being separated by a small air gap when the rotatable member supporting said rotor is in a normal, nondeflected position; and
   means responsive to movement of the rotatable member and said rotor from its normal position in a particular direction for deflecting said stator also in said particular direction so that said teeth on said rotor and said stator do not intermesh during deflection of the rotatable member.

2. In a speed sensing system including a rotatable member and a stationary member located in proximity to the rotatable member;
   a rotor attached to the rotatable member, said rotor including a plurality of spaced teeth;
   a stator movably mounted on the stationary member, said stator including a plurality of spaced teeth located in juxtaposition to the orbital path of said spaced teeth of said rotor, said juxtaposed teeth of said rotor and said stator being separated by a small air gap when the rotatable member supporting said rotor is in a normal, nondeflected position; and
   means is part associated with said rotor and in part associated with said stator and responsive to movement of the rotatable member and rotor from its normal position in a particular direction for deflecting said stator also in said particular direction so that said teeth on said rotor and said stator do not intermesh during deflection of the rotatable member.

3. In a speed sensing system including a rotatable member and a stationary member located in proximity to the rotatable member, the improvement comprising:
   a rotor member attached to the rotatable member, said rotor member having a plurality of teeth spaced about a circumferential surface thereof;
   a rotor protection device forming a portion of said rotor member and having a selected surface of a fixed diameter coaxial with said surface on which said teeth of said rotor member are located;
   a stator member movably attached to said stationary member, said stator member having a plurality of teeth spaced about a circumferential surface thereof in juxtaposition with said teeth of said rotor member, said juxtaposed teeth of said rotor member and said stator member being separated by an air gap;
   a stator protection device forming a portion of said stator member and having a selected surface of a fixed diameter coaxial with said surface on which said teeth of said stator member are located; and
   means for locating said selected surface of said stator protection device and said selected surface of said rotor protection device in an encircling relationship, the fixed diameters of the said two selected surfaces being such that an air gap smaller than said air gap between said teeth exists between said two surfaces when said rotor member and said stator member are in their normal positions whereby said two selected surfaces come into contact with one another when the rotatable member is deflected during normal operation thereof thereby to prevent contact of said teeth of said rotor member and said stator member during deflection of the rotatable member.

4. In a speed sensing system including a member rotatable about an axis and a stationary member located in proximity to the rotatable member, the improvement comprising:
   a rotor member attached to the rotatable member, said rotor member having an external circumferential surface coaxial with the axis of rotation of the rotatable member, said circumferential surface having a plurality of spaced teeth extending upwardly therefrom;
   a rotor protection device also on said outside circumferential surface of said rotor member, said protection device being in the form of a smooth, continuous surface of predetermined diameter;
   a stator member having an internal circumferential surface coaxial with the rotational axis of the rotatable member, said internal circumferential surface having a plurality of inwardly projecting spaced teeth equal in number to the spaced teeth of said rotor member;
   means for floatingly mounting said stator member on the stationary member with said teeth of said stator member being in juxtaposition to the orbital path of said teeth of said rotor member with an air gap therebetween when said stator member and rotor member are in a normal position with respect to one another;

a stator protection device forming a portion of said stator member and being in the form of an internal circumferential surface coaxial with the rotational axis of the rotatable member and having a predetermined internal diameter; and means for positioning said external circumferential surface of said rotor member adjacent said internal surface of said stator member;

the predetermined diameters of said surfaces of said rotor protection device and said stator protection device being dimensioned relative to one another such that when the rotatable member is deflected from its normal position said surface of said rotor protection device will come into intimate physical contact with said surface of said stator protection device and apply sufficient force thereto to move said stator member relative to the stationary member whereby contact of said teeth of said rotor member and said stator member is prevented during deflection of the rotatable member.

5. A speed sensing device for utilization in an anti-skid system of a motor vehicle having an axle shaft rotable about an axis and a stationary axle housing encircling the axle shaft, the device comprising:

a rotor member of annular configuration attached to the axle shaft, said rotor member having a first circumferential surface coaxial with the axis of the axle and carrying a plurality of spaced teeth extending radially outwardly therefrom to a predetermined diameter, said rotor member further having a second, smooth, circumferential surface coaxial with the axis of the axle and of the same diameter as the diameter of said teeth, said first and said second circumferential surfaces of said rotor member being axially separated from one another;

a plate affixed to said axle housing, said plate having an opening therethrough through which the axle extends;

a stator housing of generally annular configuration;

means for movably attaching said stator housing to said plate in a manner encircling the axle;

a stator of annular configuration supported within said stator housing, said stator having a plurality of teeth on an internal circumferential surface thereof in juxtaposition to the teeth carried by said rotor member attached to the axle;

a magnet of generally annular configuration mounted within said stator housing adjacent said stator;

a coil mounted within said stator housing adjacent said stator; and a locking member of annular configuration inserted in said stator housing member in a manner such that said stator, said magnet and said coil are held securely within said stator housing, said locking member being positioned within said stator housing in a position encircling said smooth circumferential surface of said rotor member, said locking member further having a portion thereof which defines a circumferential surface having an internal diameter smaller than the internal diameter of said teeth of said stator;

whereby deflection of the axle shaft with said rotor member associated therewith brings said circumferential surface of said rotor member in contact with said circumferential surface of said locking member with force to deflect said locking member and said stator housing member associated therewith whereby said teeth of said rotor member and said stator member do not come into contact with one another during deflection of the axle shaft from a normal position.

References Cited

UNITED STATES PATENTS

| | | | |
|---|---|---|---|
| 2,191,074 | 2/1940 | Herrington | 310—152 |
| 2,824,245 | 2/1958 | Trevitt | 310—168 |

FOREIGN PATENTS

| | | |
|---|---|---|
| 1,336,035 | 7/1963 | France. |

WARREN E. RAY, Primary Examiner

R. SKUDY, Assistant Examiner

U.S. Cl. X.R.

310—66